United States Patent
Bronstein et al.

(10) Patent No.: US 8,155,400 B2
(45) Date of Patent: *Apr. 10, 2012

(54) FACIAL RECOGNITION AND THE OPEN MOUTH PROBLEM

(75) Inventors: Michael Bronstein, Santa Clara, CA (US); Alexander Bronstein, San Jose, CA (US); Ron Kimmel, Haifa (IL)

(73) Assignee: Technion Research & Development Foundation L', Haifa (IL)

( * ) Notice: Subject to any disclaimer, the term of this patent is extended or adjusted under 35 U.S.C. 154(b) by 487 days.

This patent is subject to a terminal disclaimer.

(21) Appl. No.: 12/076,830

(22) Filed: Mar. 24, 2008

(65) Prior Publication Data

US 2008/0292147 A1 Nov. 27, 2008

Related U.S. Application Data

(60) Division of application No. 11/058,171, filed on Feb. 16, 2005, now Pat. No. 7,421,098, which is a continuation-in-part of application No. 10/284,281, filed on Oct. 31, 2002, now Pat. No. 6,947,579.

(60) Provisional application No. 60/416,243, filed on Oct. 7, 2002.

(51) Int. Cl.
*G06K 9/00* (2006.01)
(52) U.S. Cl. ........ 382/118; 345/419; 345/473; 345/621; 382/154; 382/165
(58) Field of Classification Search .................. 345/419, 345/473, 621; 382/118, 154, 165
See application file for complete search history.

(56) References Cited

U.S. PATENT DOCUMENTS

| | | | |
|---|---|---|---|
| 5,164,992 A | 11/1992 | Turk et al. | |
| 5,181,259 A | 1/1993 | Rorvig | |
| 5,689,575 A | 11/1997 | Sako et al. | |
| 5,933,527 A | 8/1999 | Ishikawa | |
| 6,016,148 A | 1/2000 | Kang et al. | |
| 6,028,960 A | 2/2000 | Graf et al. | |
| 6,031,539 A | 2/2000 | Kang et al. | |
| 6,047,078 A | 4/2000 | Kang | |
| 6,081,739 A | 6/2000 | Lemchen | |
| 6,091,836 A | 7/2000 | Takano et al. | |

(Continued)

FOREIGN PATENT DOCUMENTS

EP 1039417 9/2000

(Continued)

OTHER PUBLICATIONS

European Official Action Dated Aug. 5, 2008 From the European Patent Office Re.: Application No. 03753889.9.

(Continued)

*Primary Examiner* — Gregory M Desire
(74) *Attorney, Agent, or Firm* — Graeser Associates Int Inc; Dvorah Graeser

(57) ABSTRACT

A method of cropping a representation of a face for electronic processing, said method comprising: selecting a first geodesic contour about an invariant reference point on said face, setting a region within said first geodesic contour as a first mask, selecting a second geodesic contour about a boundary of said identified first region, setting a region within said second geodesic contour as a second mask, and forming a final mask from a union of said first mask and said second mask.

6 Claims, 13 Drawing Sheets

U.S. PATENT DOCUMENTS

| | | | |
|---|---|---|---|
| 6,163,322 | A | 12/2000 | LaChapelle |
| 6,250,928 | B1 * | 6/2001 | Poggio et al. ............... 434/185 |
| 6,272,231 | B1 | 8/2001 | Maurer et al. |
| 6,285,805 | B1 | 9/2001 | Gueziec |
| 6,295,785 | B1 | 10/2001 | Herrmann |
| 6,381,346 | B1 * | 4/2002 | Eraslan ..................... 382/118 |
| 6,384,826 | B1 | 5/2002 | Bern et al. |
| 6,526,161 | B1 | 2/2003 | Yan |
| 6,539,126 | B1 | 3/2003 | Socolinsky et al. |
| 6,556,196 | B1 | 4/2003 | Blanz et al. |
| 6,571,227 | B1 | 5/2003 | Agrafiotis et al. |
| 6,628,280 | B2 | 9/2003 | Perry et al. |
| 6,671,391 | B1 | 12/2003 | Zhang et al. |
| 6,677,949 | B1 | 1/2004 | Gioia |
| 6,728,404 | B1 | 4/2004 | Ono et al. |
| 6,731,287 | B1 | 5/2004 | Erdem |
| 6,807,290 | B2 | 10/2004 | Liu et al. |
| 6,947,579 | B2 | 9/2005 | Bronstein et al. |
| 6,982,710 | B2 | 1/2006 | Salomie |
| 7,027,054 | B1 * | 4/2006 | Cheiky et al. ............... 345/473 |
| 7,039,621 | B2 | 5/2006 | Agrafiotis et al. |
| 7,379,602 | B2 | 5/2008 | Yang |
| 2002/0012454 | A1 * | 1/2002 | Liu et al. ................... 382/118 |
| 2002/0130860 | A1 | 9/2002 | Perry et al. |
| 2003/0063801 | A1 | 4/2003 | Rubinstenn et al. |
| 2004/0008809 | A1 | 1/2004 | Webber |
| 2004/0076313 | A1 | 4/2004 | Bronstein et al. |
| 2004/0175039 | A1 | 9/2004 | Miller |
| 2005/0041867 | A1 | 2/2005 | Loy et al. |
| 2005/0162419 | A1 | 7/2005 | Kim et al. |
| 2005/0180613 | A1 | 8/2005 | Bronstein et al. |
| 2006/0115157 | A1 | 6/2006 | Mori et al. |
| 2006/0188144 | A1 | 8/2006 | Sasaki et al. |
| 2006/0251298 | A1 | 11/2006 | Bronstein et al. |
| 2007/0052726 | A1 | 3/2007 | Wright et al. |
| 2009/0028442 | A1 | 1/2009 | Kimmel et al. |

FOREIGN PATENT DOCUMENTS

| | | |
|---|---|---|
| JP | 2001-503546 | 3/2001 |
| WO | WO 98/20459 | 5/1998 |
| WO | WO 2004/032061 | 4/2004 |
| WO | WO 2004/044689 | 5/2004 |
| WO | WO 2006/087701 | 8/2006 |

OTHER PUBLICATIONS

Official Action Dated Nov. 28, 2008 From the US Patent and Trademark Office Re.: U.S. Appl. No. 11/218,597.
International Preliminary Report on Patentability Dated Jul. 22, 2008 From the International Bureau of WIPO Re.: Application No. PCT/IL2006/000172.
International Preliminary Report on Patentability Dated Aug. 30, 2007 From the International Bureau of WIPO Re.: Application No. PCT/IL2006/000172.
International Search Report and the Written Opinion Dated Jun. 30, 2006 From the International Searching Authority Re.: Application No. PCT/IL2006/000172.
Official Action Dated Feb. 16, 2007 From the US Patent and Trademark Office Re.: U.S. Appl. No. 11/058,171.
Official Action Dated Apr. 30, 2008 From the US Patent and Trademark Office Re.: U.S. Appl. No. 11/218,597.
Official Action Dated May 31, 2007 From the US Patent and Trademark Office Re.: U.S. Appl. No. 11/058,171.
Communication Pursuant to Rules 109 and 110 EPC Dated May 17, 2005 From the European Patent Office Re.: Application No. 03753889.9.
Communiction Pursuant to Article 94(3) EPC Dated Dec. 13, 2007 From the European Patent Office Re.: Application No. 03753889.9.
Notice of Allowance Dated Jul. 9, 2009 From the US Patent and Trademark Office Re.: U.S. Appl. No. 11/218,597.
Translation of Notice of Reason for Rejection Dated Jul. 3, 2009 From the Japanese Patent Office Re.: Application No. 2004-541146.

Elad et al. "Bending Invariant Representations for Surfaces", Proceedings of the IEEE Conference on Computer Vision and Pattern Recognition, Kauai, Hawaii and Los Alamitos, CA, USA, 1: 168-174, 2001. p. 168, col. 2, § 2, p.168, Col. 1, Section 2 'Fast Marching on Triangulated Domains', p. 169, col. 1, § 1, 2, Section 3 'MDS', p. 171, col. 1, Last §—p. 172, col. 2, § 1, p. 172, col. 2, § 3, p. 173, col. 1, § 1.
Su et al. "An Automatic Construction of a Person's Face Model From the Person's Two Orthogonal Views", Proceedings of the IEEE Geometric Modeling and Processing—Theory and Applications, Piscataway, NJ, USA, p. 179-186, 2002. Abstract, p. 180, col. 1, § 2, Fig.1.
Zigelman et al. "Texture Mapping Using Surface Flattening Via Multidimensional Scaling", IEEE Transactions on Visualization and Computer Graphics, 8(2): 198-207, 2002. Abstract, p. 201, col. 2, Section 4 'The Flattening Approach'.
Beumier et al. "Automatic Face Authentication From 3D Surface", British Machine Vision Conference BMVC 98, Univ. Southampton, UK, p. 449-458, 1998.
Beumier et al. "Automatic Face Identification", Proc. SPIE., 2564: 311-323, Applications of Digital Image Processing XVIII, 1995. Abstract.
Bronstein et al. "Three-Dimensional Face Recognition", URL: http://www.cs.technion.ac.il/{bron/publications/BroBroKimIJCV05.pdf>, 43 P., 2004. Abstract.
Gold et al. "Problems With Handling Spatial Data—The Voronoi Approach", CISM Journal ACSGC, 45(1): 65-80, 1991.
Gordon "Face Recognition From Frontal and Profile Views", Intl. Workshop on Automatic Face and Gesture Recognition, Zurich, 1995.
Sethian "Fast Marching Methods", SIAM Review, 41(2): 199-235, 1999.
Communication Pursuant to Article 94(3) EPC Dated Dec. 13, 2007 From the European Patent Office Re.: Application No. 03753889.9.
Supplementary European Search Report Dated Sep. 10, 2007 From the European Patent Office Re.: Application No. 03753889.9.
International Search Report Dated Jun. 30, 2006 From the International Searching Authority Re.: Application No. PCT/IL2006/000172.
Written Opinion Dated Jun. 30, 2006 From the International Searching Authority Re.: Application No. PCT/IL2006/000172.
Notice of Allowance Dated Dec. 11, 2007 From the US Patent and Trademark Office Re.: U.S. Appl. No. 11/058,171.
Official Action Dated Jun. 15, 2006 From the US Patent and Trademark Office Re.: U.S. Appl. No. 11/058,171.
Official Action dated Mar. 3, 2006 From the US Patent and Trademark Office Re.: U.S. Appl. No. 11/058,171.
Official Action dated Jan. 25, 2005 From the US Patent and Trademark Office Re.: U.S. Appl. No. 10/284,281.
Notice of Allowance Dated May 3, 2005 From the US Patent and Trademark Office Re.: U.S. Appl. No. 10/284,281.
Official Action dated Jun. 8, 2004 From the US Patent and Trademark Office Re.: U.S. Appl. No. 10/284,281.
International Preliminary Examination Report Dated Aug. 12, 2004 From the International Preliminary Examining Authority Re.: Application No. PCT/IL03/00805.
International Search Report Dated Feb. 19, 2004 From the International Searching Authority Re.: Application No. PCT/IL03/00805.
Official Action Dated Jan. 7, 2010 From the US Patent and Trademark Office Re.: U.S. Appl. No. 12/076,830.
Notice of the Reason for Rejection Dated Oct. 26, 2009 From the Korean Intellectual Property Office Re.: Application No. 2005-7005981 and Its Translation Into English.
Response Dated Oct. 11, 2009 to Office Action of Jun. 7, 2009 From the Israeli Patent Office Re.: Application No. 185282.
Response Dated Nov. 30, 2009 to Notice of the Reasons for Rejection of Oct. 26, 2009 From the Korean Intellectual Properly Office Re.: Application No. 2005-7005981.

* cited by examiner

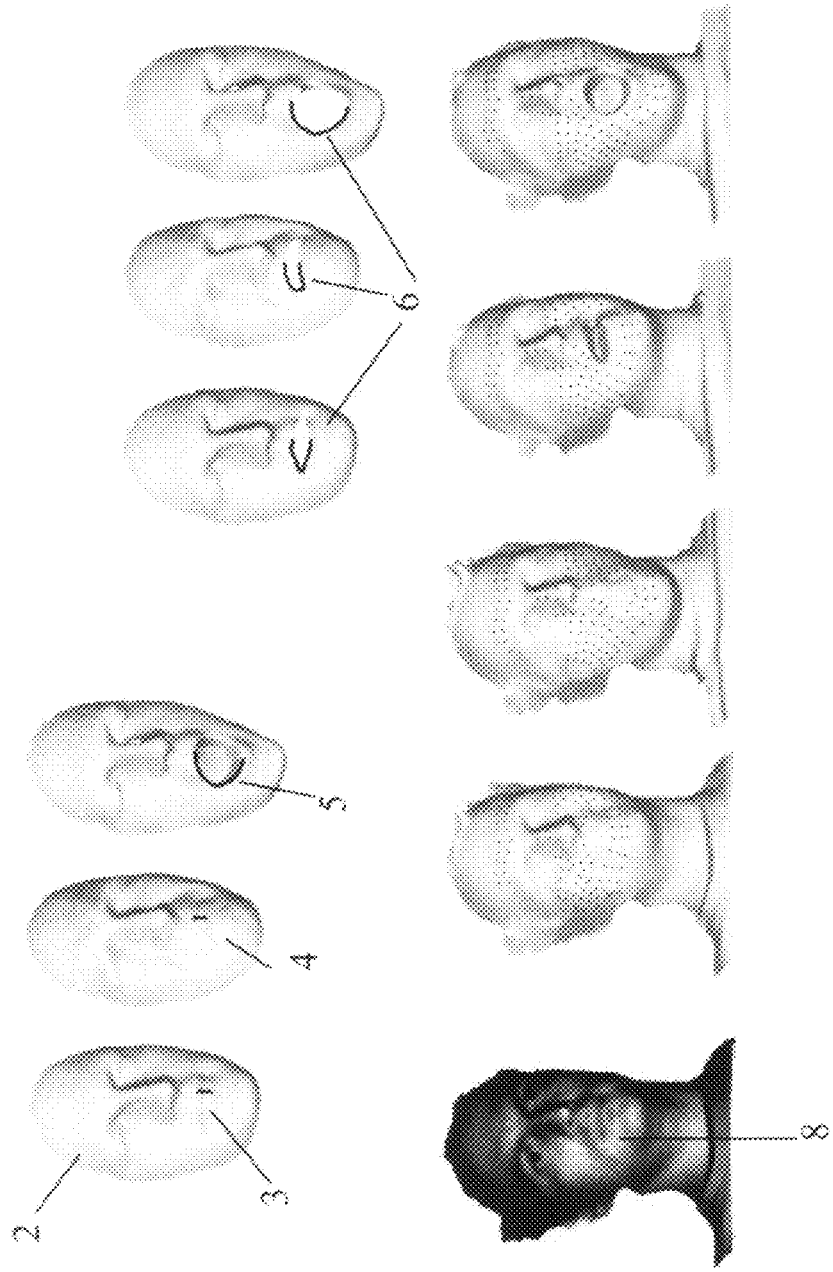

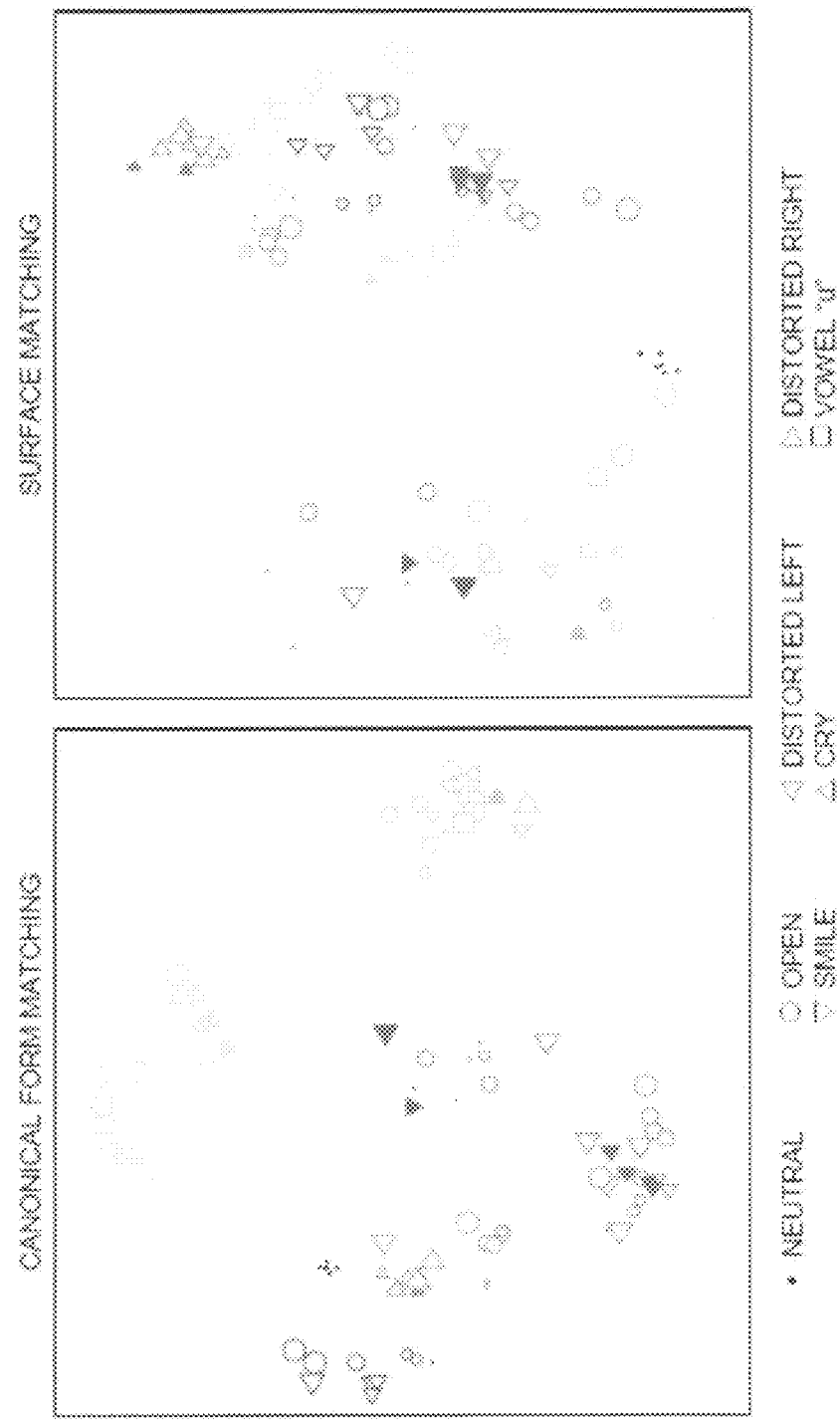

FACIAL RECOGNITION AND THE OPEN MOUTH PROBLEM

RELATIONSHIP TO EXISTING APPLICATIONS

This application is a Divisional of U.S. patent application Ser. No. 11/058,171, filed on Feb. 16, 2005, now U.S. Pat. No. 7,421,098 issued Sep. 2, 2008, which is a Continuation-In-Part of U.S. patent application Ser. No. 10/284,281 filed on Oct. 31, 2002, now U.S. Pat. No. 6,947,579, issued on Sep. 20, 2005, which claims priority from U.S. Provisional Patent Application No. 60/416,243 filed on Oct. 7, 2002, the contents of all of which are hereby incorporated by reference.

FIELD AND BACKGROUND OF THE INVENTION

The present invention relates to facial recognition and the open mouth problem and, more particularly, but not exclusively to a method and apparatus for three dimensional facial recognition that can distinguish between different expressions of the same face on the one hand and different faces on the other hand.

An important question in understanding the structure of facial appearance, is what are the invariants of a human face under various expressions. The change of a face by expressions makes modelling of the face and extraction of features that are not influenced by those changes a challenging task.

It was previously suggested to treat faces as deformable surfaces in the context of Riemannian geometry, and modelling facial expressions as near-isometric transformations of the facial surface. The method of bending-invariant canonical forms was used to construct a representation of the faces, invariant to such isometric transformations. The isometric model, however, has difficulties in handling facial expressions that change the topology of the facial surface. One such example is comparing a face with an open mouth to one with a closed mouth.

That is, how can someone's face be given a unique description, that does not change by his or her expression. Important examples include the problem of face recognition in computer vision, texture mapping for facial animation in computer graphics, emotion interpretation in psychology, and measurement of geometric parameters of the face in cosmetic surgery. The variability of the face appearance due to the non-rigid structure of the human face makes this a non-trivial task and challenges for a convenient model to analyze the nature of facial expressions. In previous work we proposed an isometric model for the face geometry, according to which expressions can be approximated by metric preserving transformations of the facial surface. The use of such a model allows us to use the bending-invariant canonical forms in order to construct an expression-invariant representation of the face. Our isometric model was shown to be applicable to strong facial expressions, but it implicitly assumes that facial expressions are topology-preserving. Thus we had a problem comparing faces with an open mouth to those with a closed one, which is a case in which the topology is not preserved.

FIG. 1A demonstrates this phenomenon by showing the geodesics 3, 4 and 5 between two points on the upper and the lower lips of a face 2. As long as the mouth is closed, the geodesics cross the lips without any significant change, even for extreme facial expressions, compare geodesics 3 and 4. However, opening the mouth changes completely the length of the minimal geodesics. In this case, the geodesic between the two lips passes along the lip contour, as indicated by reference numeral 5. In other words, our previous model always required that in all expressions the mouth has to be either always closed or always open.

There is thus a widely recognized need for, and it would be highly advantageous to have, a facial recognition system devoid of the above limitations, and able to recognize the face irrespective of whether the mouth is open or closed, overcoming the fact that the two cases are topologically different.

SUMMARY OF THE INVENTION

According to one aspect of the present invention there is provided a method of cropping a representation of a face for electronic processing, said method comprising:

selecting a first geodesic contour about an invariant reference point on said face, setting a region within said first geodesic contour as a first mask, selecting a second geodesic contour about a boundary of said identified first region, setting a region within said second geodesic contour as a second mask, and forming a final mask from a union of said first mask and said second mask.

In an embodiment, said identifying comprises texture processing.

An embodiment may comprise cropping said face by:

forming a final mask from a union of said first mask and said second mask.

According to a second embodiment of the present invention there is provided apparatus for cropping a representation of a face for electronic processing, said face having differential mouth opening states including an open mouth state, a closed mouth state and at least one intermediate state therebetween, the apparatus comprising:

a first masking unit for selecting a first geodesic contour about an invariant reference point on said face, and setting a region within said first geodesic contour as a first mask, a second masking unit for selecting a second geodesic contour about a boundary of said identified mouth region, and setting a region within said second geodesic contour as a second mask, and a third masking unit for forming a final mask from a union of said first mask and said second mask, thereby to provide cropping of said face such as to obtain a full facial region and negligible background within said cropping for any of said mouth opening states.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified diagram showing a face in different mouth open states, illustrating a geodesic drawn between the lower and upper lips in the different mouth open states and illustrating why the geodesic model has difficulty with mouth open states;

FIG. 1B is a simplified diagram showing the same set of mouth open states where the geodesic is constrained according to a first preferred embodiment of the present invention to pass around the mouth irrespective of the mouth being open or shut;

FIG. 1C is a simplified diagram illustrating reference points taken over a face and showing how they move as the face enters different mouth open states;

FIG. 15A illustrates results obtained using the present embodiments, in which faces cluster irrespective of the expressions; and FIG. 15B illustrates results obtained using surface matching, in which the faces fail to cluster.

DESCRIPTION OF THE PREFERRED EMBODIMENTS

Figure 1E:
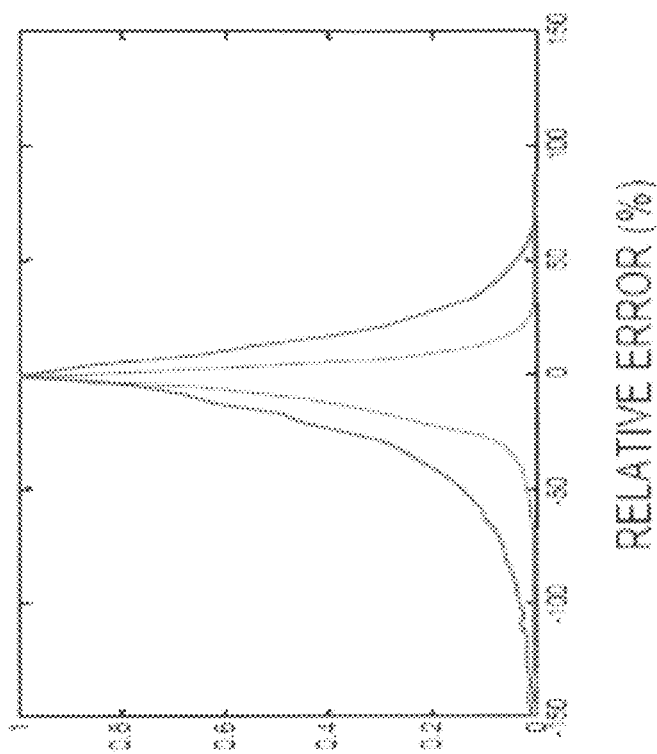
FIGS. 1D and 1E are simplified diagrams illustrating absolute and relative changes in distances respectively due to changes in expression of the same face.

The present embodiments comprise a solution to the open mouth problem that operates by enforcing a constraint to the topology on the facial surface, in particular about the mouth region. In one embodiment the constraint is that the mouth is always closed, in effect gluing the lips. In an alternative embodiment the constraint is that the mouth is always open, and this is achieved by disconnecting the lips. The disconnection can be achieved by introducing a cut in the surface when the mouth is closed. In either case the constraint provides for a geodesic that passes vertically through the lip region to follow the same path regardless of whether the mouth is open or closed.

The examples herein focus on the second, disconnecting, solution, but the skilled person will appreciate that the principles described herein are readily applicable to the first, glued, solution as well. The following description presents the concept of topologically-constrained canonical forms, that allow us to construct a representation of the face that is insensitive to facial expressions, and remains so irrespective of changes of state between closed and open mouths.

The principles and operation of a facial recognition system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1B, which shows the same series of faces as in FIG. 1A, which vary in the extent to which the mouths are open. According to the present embodiment the region of the mouth is excluded from consideration when drawing geodesics, so that the representation always treats the mouth as open, and the geodesic goes around the excluded region. Therefore it makes no difference whether the mouth is open or shut. The geodesic 6 always goes around the mouth, and the mouth open state now ceases to have topological relevance for the model.

Figure 1D:
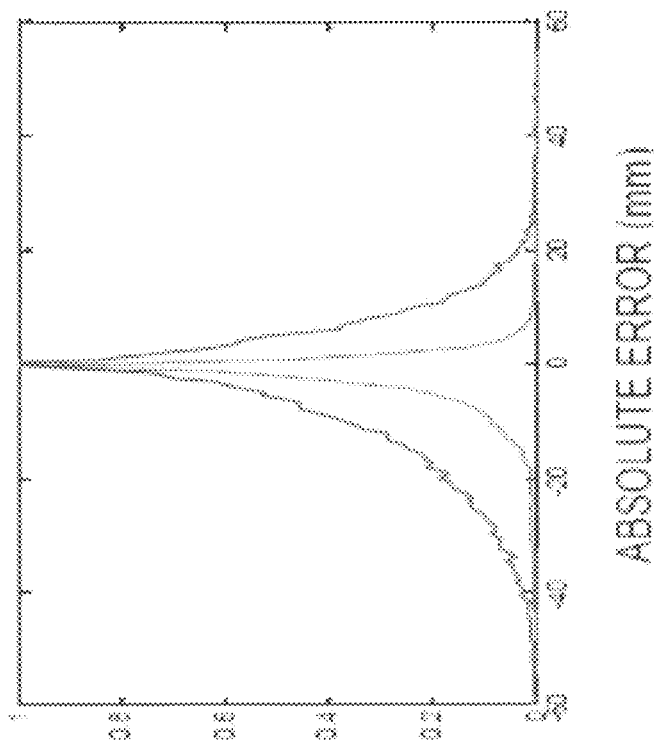

Reference is now made to FIG. 1C, which is a simplified diagram illustrating how the above operation may be performed. A face 8 is converted into a cloud of sample points. The sample points avoid the mouth area, since the mouth area is excluded. Furthermore all geodesics avoid the mouth area so that even when the sample points move, the relationships between the sample points, as measured by the linking geodesics does not change very much. Thus the geometric relationship between the sample points does not change significantly whatever the expressions of the face. FIGS. 1D and 1E show absolute and relative changes respectively in distances for changes in expression of the same face. The distance measurement used is discussed in more detail hereinbelow.

Figure 2A:
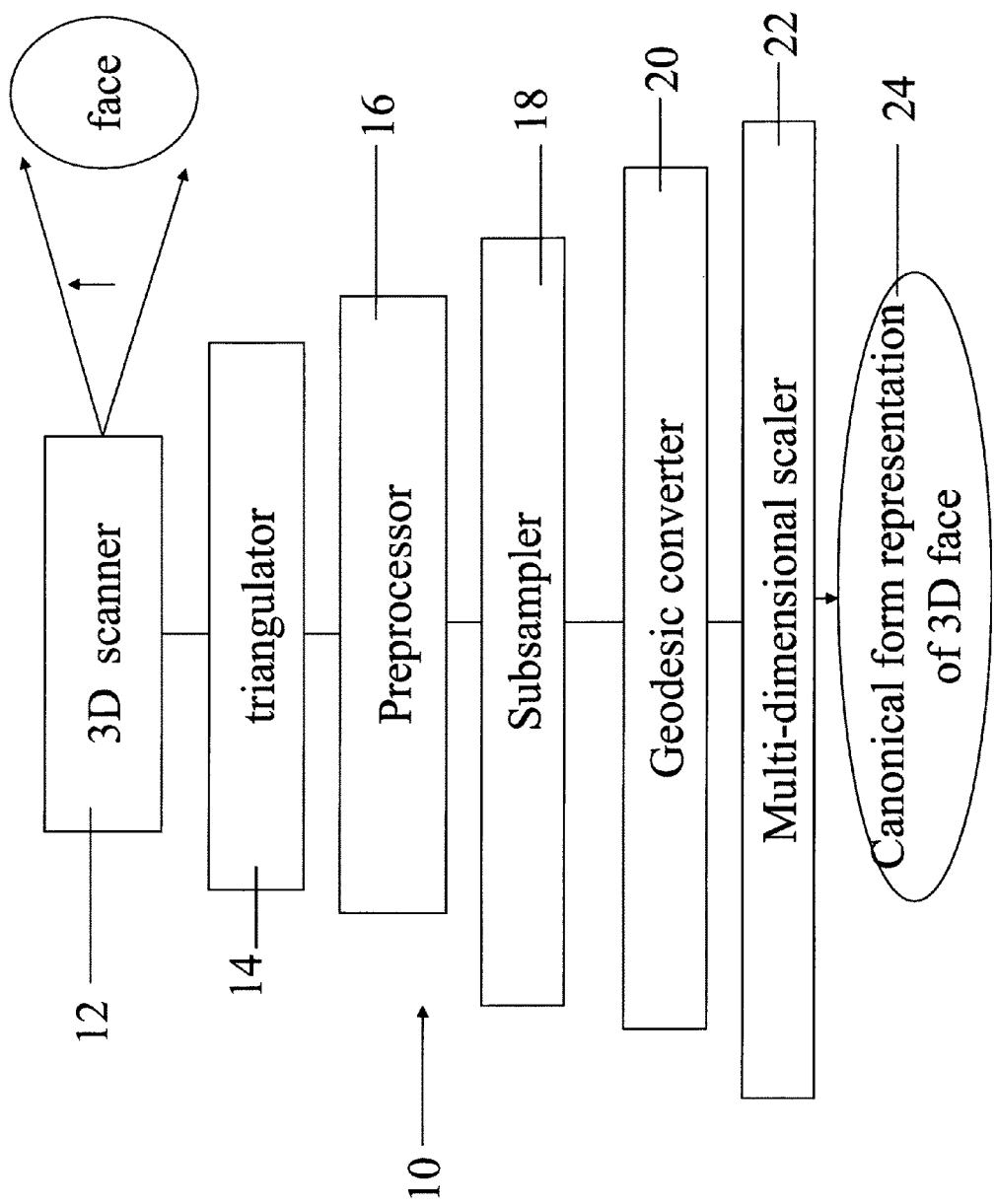
FIG. 2A is a simplified diagram of apparatus for converting 3D data into a canonical form representation of a face.

The issue is now considered in greater detail. Reference is now made to FIG. 2A, which is a simplified diagram showing apparatus for obtaining 3-Dimensional data of a geometric body for classification, including matching, according to a first preferred embodiment of the present invention. The preferred embodiments relate specifically to matching of faces but the skilled person will be aware that the principles of the present invention are applicable to any geometric body having a three-dimensional structure.

Apparatus 10 comprises a three dimensional scanner 12 for obtaining three-dimensional topographical data of the body. Several types of scanner are described hereinbelow together with brief discussions of how to process data therefrom in some of the cases.

Data from the three-dimensional scanner 12 is passed to a triangulator 14. The triangulator may perform triangulation on the data received from the scanner in order to generate a three-dimensional triangulated manifold to represent the topological features of the body. The exact operation of the triangulator to derive the manifold may vary depending on the way in which the 3D information is gathered. In certain cases the manifold may be formed directly from the gathered data without the need for any intervening processing stage. The manifold preferably represents all of the three-dimensional topology of the body and therefore is in theory sufficient for allowing matching. However, in practice, direct comparisons using the triangulated manifold have a number of disadvantages, as will be demonstrated in the results given hereinbelow. They requires a large amount of calculation. Matching does not distinguish reliably between different faces. Moreover matching generally fails when the same face has a different expression and matching is unreliable even when the same face is posed at a different angle.

Figures 8, 9:
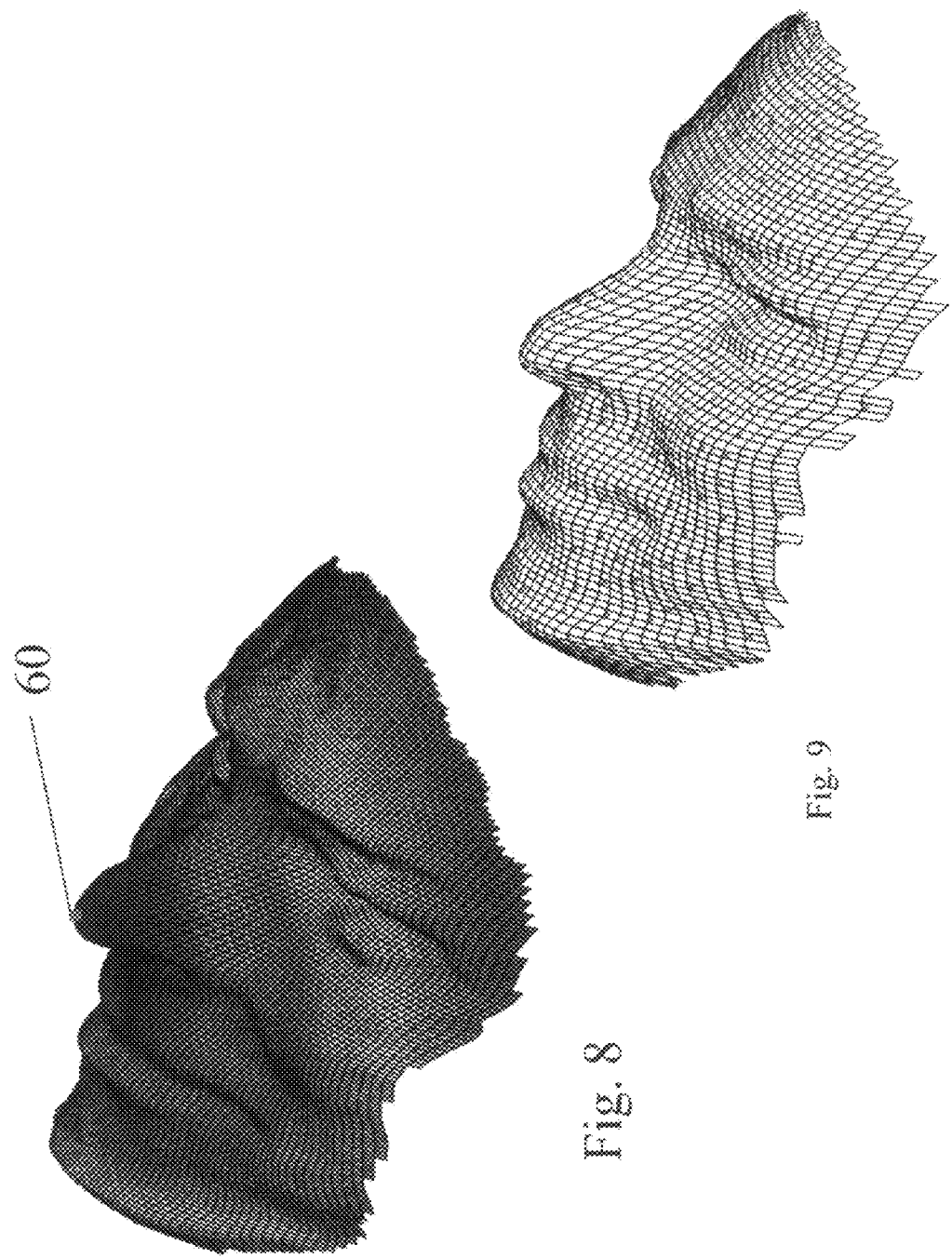
FIG. 8 is a simplified diagram illustrating a facial manifold and showing the identification of an absolute reference point.
FIG. 9 shows the development of relative reference points over the manifold following identification of the absolute reference point.

Embodiments of the present invention therefore preferably include four additional processing stages, the first of which is a preprocessor 16. Preprocessor 16 takes a reference point in order to determine an orientation around the manifold. A reference point which is relatively easy to find automatically from a manifold of a face is the tip of the nose. Other possible reference points include centers of eyeballs and the center of the mouth. Once the preprocessor has found the tip of the nose (FIG. 8) it is able to orientate itself with respect to the rest of the face and then parts of the face whose geometry is particularly susceptible to expressions, hereinafter referred to as soft regions, can be ignored. Parts of the face that are invariant with change of expression and the like, hereinafter hard regions, can be retained or even emphasized. Further relative reference points can be added, as shown in FIG. 9 below. As will be explained in greater detail below, the definition of soft regions is not fixed. For some methods and in some circumstances soft regions to be excluded may include all of the lower region of the face around the mouth. It is to be noted that the exclusion referred to here is the exclusion of regions from adding reference points, and is not the same as lip cropping discussed hereinbelow. In other cases less drastic exclusions may be considered. In one embodiment, soft regions are removed using a geodesic mask. The mask may be applied separately to a texture map of the face and a depth map of the face.

Following the preprocessor is a subsampler 18. The subsampler 18 takes the preprocessed manifold and removes points so as to produce a less well defined manifold, but one which still defines the essential geometry of the face it is desired to match. In preferred embodiments, the user is able to select the number of points to trade off between accurate matching—a large number of points—and faster processing—a smaller number of points. As will be discussed in greater detail below, a preferred embodiment of the subsampler uses the Voronoi subsampling technique which begins at an initial point or vertex on the manifold and then adds the point or vertex having the greatest distance therefrom. The procedure is repeated iteratively until the selected number of points are included. Preferably the technique uses geodesic distances, which may be obtained using the fast marching method for the triangulated domain (FMM-TD), as described below.

Following the subsampler is a geodesic converter 20. The geodesic converter 20 receives the list of points of the subsampled manifold and calculates a vector for each pair of points. The vectors are expressed as geodesic distances, and the fast marching algorithm for the triangulated domain is again used to obtain the geodesic distances in as efficient a manner as possible.

Following the geodesic converter is a multi-dimensional scaler 22, which takes the matrix of the geodesic distances calculated by the geodesic converter 20, referred to below as the distance matrix, and forms a low dimensional Euclidean representation of the series of geodesic distances, using multi-dimensional scaling. Multi-dimensional scaling is discussed in detail below. The low dimensional Euclidean representation provides a bending invariant representation of the geometric body, as will be explained in the discussion on multi-dimensional scaling below. The use of such a bending invariant representation ensures that the matching process is not fooled by, for example, scans of the head at different angles.

The output 24 of the multi-dimensional scalar is a representation of the 3D face in terms of Euclidean distances between surface points, referred to hereinbelow as the canonical form representation.

Figure 2B:
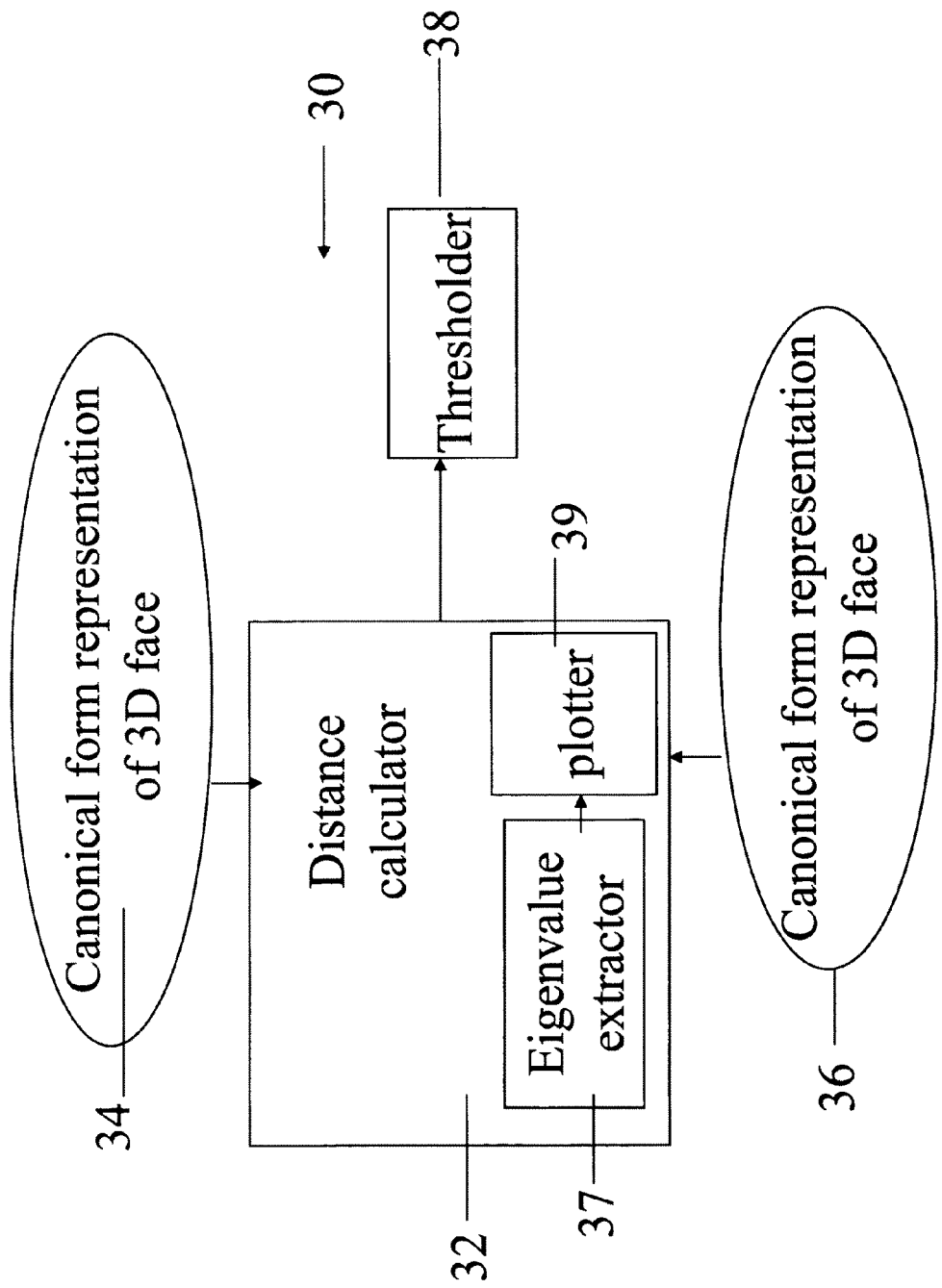
FIG. 2B is a simplified diagram of apparatus for distance measurement between faces using representations produced by the apparatus of FIG. 2A.

Reference is now made to FIG. 2B, which is a simplified diagram showing a matching apparatus for matching two faces using the canonical form output as described above. The matcher 30 may be a continuation of the apparatus 10 or may be supplied as a separate unit. The matcher 30 comprises a distance calculator 32, which takes as input two canonical form representations 34 and 36, and calculates a distance therebetween. The distance calculation may use any suitable method for comparison of the canonical forms for each of the faces to be matched. A straightforward approach is to measure a distance between two sets of points, using, for example, the Hausdorff metric. However, the Hausdorf metric based method is computationally extensive.

An alternative approach, used in the present embodiments, takes the first m eigenvalues obtained from the MDS procedure to provide coordinates in a low-dimensional feature space. Although the dominant eigenvalues do not describe the canonical form entirely, it is reasonable that similar faces have similar eigenvalues (and thus form clusters in the feature space). A distance is calculated between the geometric bodies, or, as will be described below, plotted on a graph of the feature space and a thresholder 38, which is connected subsequently to the distance calculator, thresholds the calculated distance to determine the presence or absence of a cluster in the feature space, the cluster indicating a match. In the embodiments described in detail herein, the first three Eigenvalues are taken and are plotted in a three dimensional feature space.

A quantitative validation of our topologically-constrained isometric model is possible by tracking a set of feature points on the facial surface and measuring how the distances between them change due to facial expressions, while ensuring that the topology of the surface is preserved. Unfortunately, there are very few points that can be located accurately on a human face. In order to overcome this difficulty, we placed 133 white round markers (approximately 2 mm in diameter) as invariant fiducial points, onto our subject's face. These markers are explained with respect to FIG. 1C, which shows a facial expressions experiment. On the leftmost side of the figure is a first facial image 8 with the markers. Then, moving towards the right are examples of four facial expressions with the same marked reference points, but the reference points have moved due to the changing expressions of the subject. The markers are selected so as to be easily detected under a variety of facial expressions as exemplified by the four faces towards the left in the figure. In the experiment, sixteen faces were in fact used, between them having weak, medium and strong facial expressions, including open and shut mouth. Lips were cut out, in the manner discussed with respect to FIG. 1B above, to enforce a fixed topology. The reference points were manually labelled; then the Fast Marching algorithm was used to compute the geodesic distances between them. For details of the Fast Marching algorithm see R. Kimmel and J. A. Sethian. Computing geodesic on manifolds. In *Proc. US National Academy of Science*, volume 95, pages 8431-8435, 1998, the contents of which are hereby incorporated herein by reference. As explained, due to the constraint that all geodesics must run around the mouth irrespective of whether the mouth is actually open or not, the distances did not change that much for different mouth open states.

In order to quantify the changes of the distances due to expressions, we use two measures: the absolute error w.r.t the reference distances (the reference distances were averaged on the neutral expressions): $\epsilon_i^{abs} = d_i - d_i^{ref}$, and the relative error $\epsilon_i^{rel} = (d_i - d_i^{ref})/d_i^{ref}$ (here $d_i$ denotes the i-th distance and $d_i^{ref}$ is the corresponding reference distance). The distributions of $\epsilon^{abs}$ and $\epsilon^{rel}$ are shown in FIGS. 1D and 1E respectively. The standard deviation of $\epsilon^{abs}$ is 5:89 mm for geodesic distances and 12:03 mm for Euclidean ones (a difference of 104:3%). The standard deviation of $\epsilon^{rel}$ was 15:85% for geodesic distances and 39:6% for Euclidean ones (a difference of 150:2%).

The conclusion of this experiment is two-fold. First, the changes of the geodesic distances due to facial expressions are insignificant for exaggerated expressions, which justifies the present model. Secondly, Euclidean distances are much more sensitive to changes due to facial expressions compared to the geodesic ones. This observation will be reinforced by the results presented hereinbelow, where we compare our method to a method that treats facial surfaces as rigid objects.

Preprocessing

Figure 3:
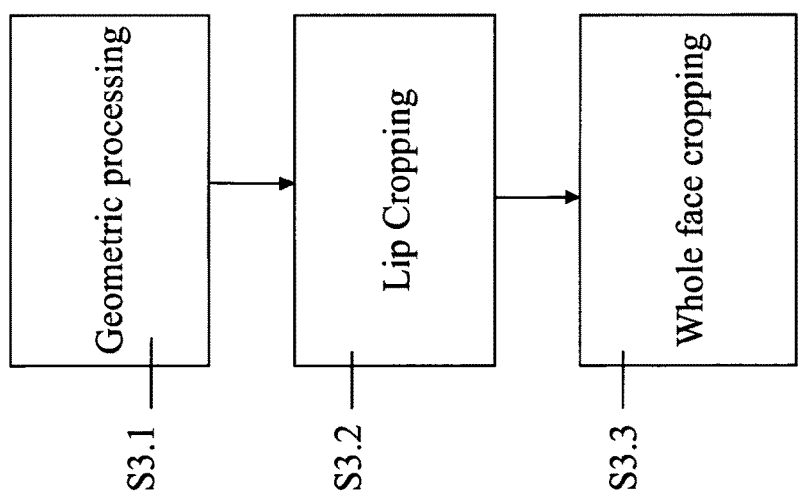
FIG. 3 is a simplified flow diagram illustrating a process for applying a constraint around the mouth region of a facial representation produced by the apparatus of FIG. 2A.

The geometry of the face is acquired by a range camera and has to be processed before the canonical form is computed. The raw range data is given as a cloud of points, that can be triangulated or represented as a parametric manifold as shown in FIG. 1C. Preprocessing according to the present embodiments is illustrated in the flow chart of FIG. 3. As illustrated the process includes three steps:

(i) geometric processing of the facial surface S3.1;
(ii) lip cropping S3.2; and
(iii) cropping the whole face S3.3.

Figure 4:
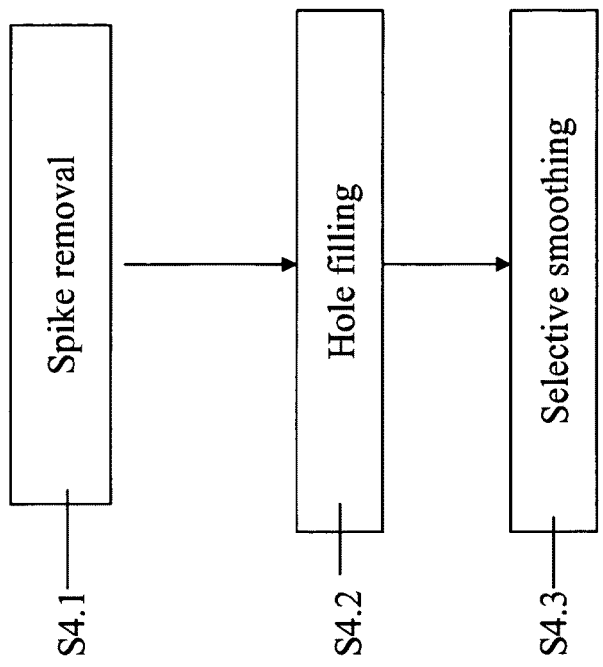
FIG. 4 is a simplified flow diagram illustrating in greater detail the geometric processing of FIG. 3.

Geometric processing S3.1 is shown in greater detail in the flow chart of FIG. 4 to include three stages of spike removal S4.1, hole filling S4.2 and selective smoothing, S4.3. For details on the three stages of geometric processing see M. Bronstein, A. Bronstein, and R. Kimmel. Three-dimensional face recogntion. Technical Report CIS-2004-04, Dept. of Computer Science, Technion, Israel, 2003, the contents of which are hereby incorporated by reference.

Figure 5:
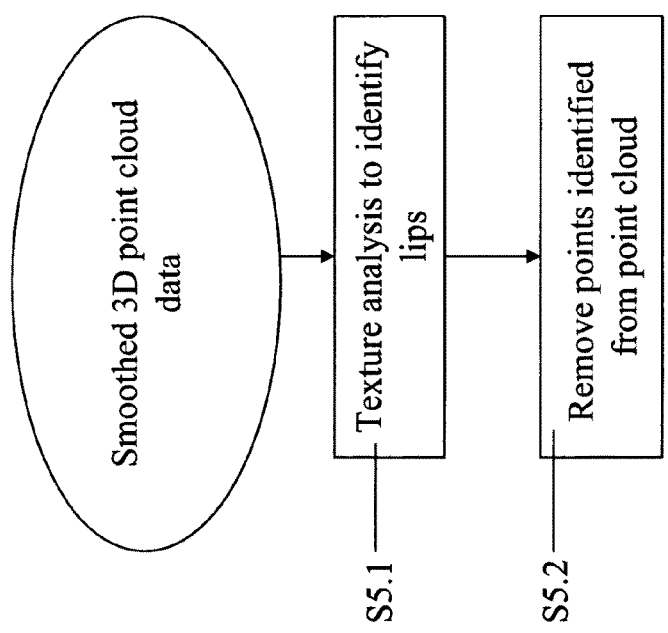
FIG. 5 is a simplified flow diagram illustrating in greater detail the lip cropping process of FIG. 3.

Lip cropping is shown in greater detail in the simplified flow chart of FIG. 5. Lip cropping is preferably performed by first segmenting the lips based on the texture information S5.1, and then removing the corresponding points in the 3D data S5.2.

Figure 6:
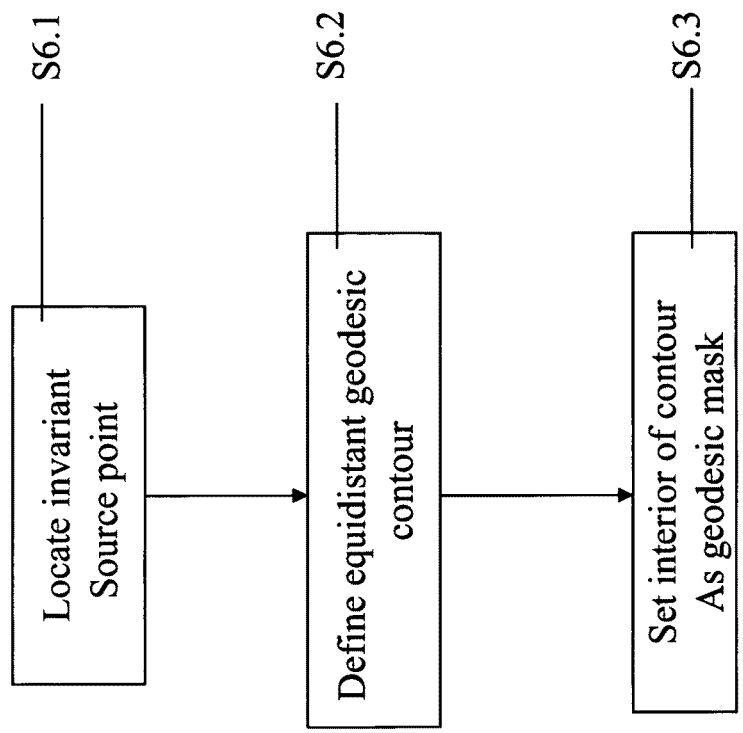
FIG. 6 is a simplified flow diagram showing facial cropping for use with the apparatus of FIG. 3.

The whole face cropping procedure is performed using a modification of the geodesic mask proposed in our U.S. patent application Ser. No. 10/284,281. The unmodified version is shown in FIG. 6. The key idea of the geodesic mask computation is locating an invariant "source" point on the face (e.g. the tip of the nose), S6.1, and measuring an equidistant (in sense of the geodesic distances) contour around it, S6.2. The geodesic mask is defined in S6.3 as the interior of this contour and all points outside the contour are removed. This allows us to crop the facial surface in a consistent manner, insensitively to facial expressions. In case of topological changes, however, the geodesic mask looses its invariance, as the geodesic distances are influences by the "hole" created at the mouth location. That is to say, if the user opens his mouth, the chin rotates downwardly away from the front of the face, and the boundary geodesic tends therefore to lose the bottom of the chin.

Figure 7:
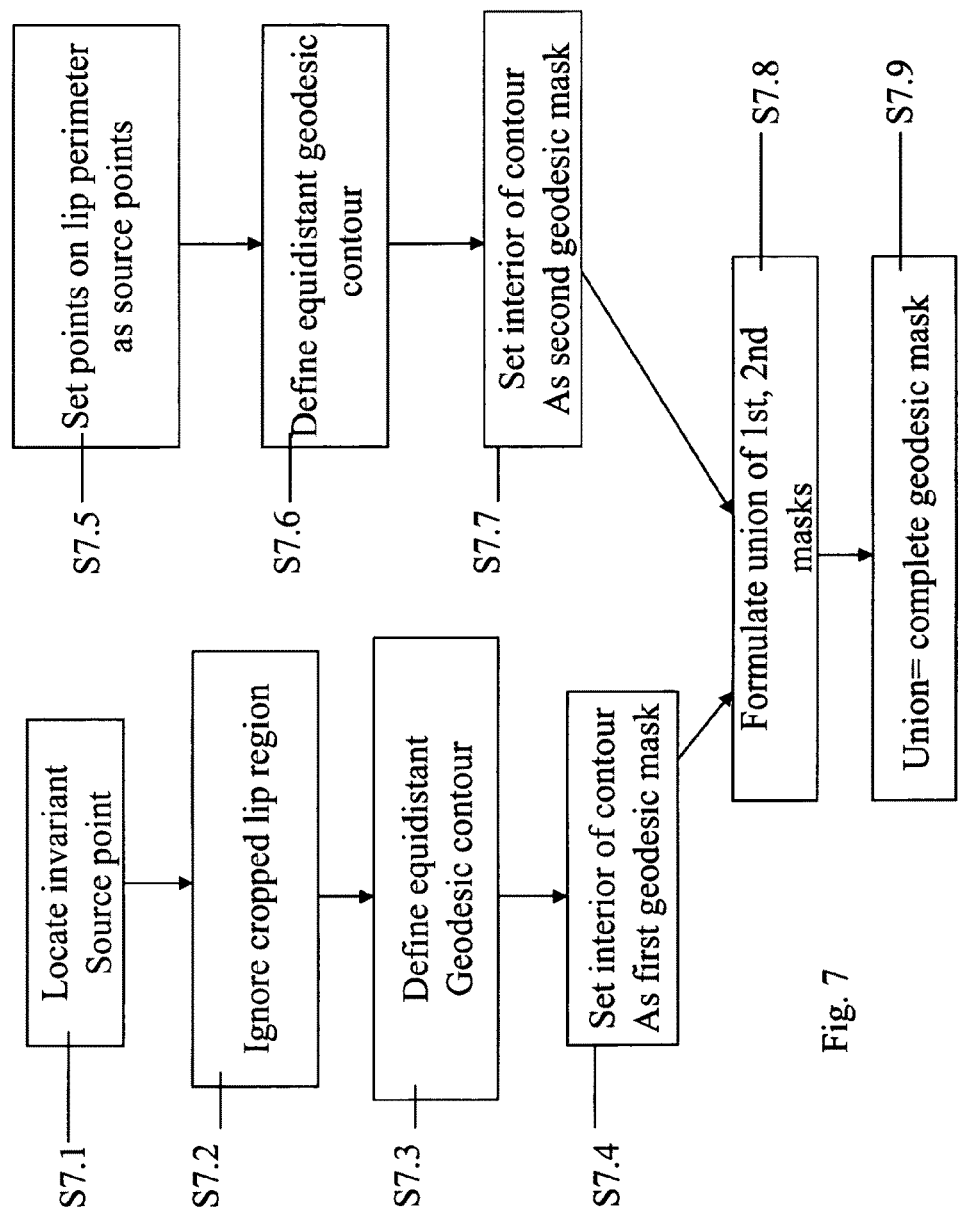
FIG. 7 is a simplified flow diagram illustrating a variation of facial cropping to ensure that maximum facial area and minimum non-facial area remains after cropping irrespective of a mouth open state of the face.

Reference is now made to FIG. 7, which is a simplified flow chart of a method of carrying out whole face cropping which overcomes the above problem. As shown in FIG. 7 the embodiment uses two masks. A first mask is computed in stages S7.1 to S7.4. in which an equidistant region around the nose tip is computed on the facial surface as before and ignoring the fact that the lips are cut.

A second mask is then defined in stages S7.5 to S7.7, in which an equidistant region around the lips is used. In S7.5 we use all the points along the lip perimeter as source points. In S7.6 an equidistant geodesic contour is set around the lips and in S7.7 the region within the contour is set as a second mask. In stage 7.8 a union of the first and second masks is calculated and the final geodesic mask is set in stage 7.9 as that union. Typically the cropped surface contains N≈3000 points.

FIG. 8 is a simplified illustration of a manifold and shows the selection of an invariant point, the nose tip 60, which is an easy point for a machine to find and use as a reference. As will be shown below, the system can be given improved reliability by using two such points, for example the nose tip and the center of the bridge of the nose.

FIG. 9 shows a facial manifold with a cloud of points developed from an initial reference point such as that shown in FIG. 8.

Figure 10:
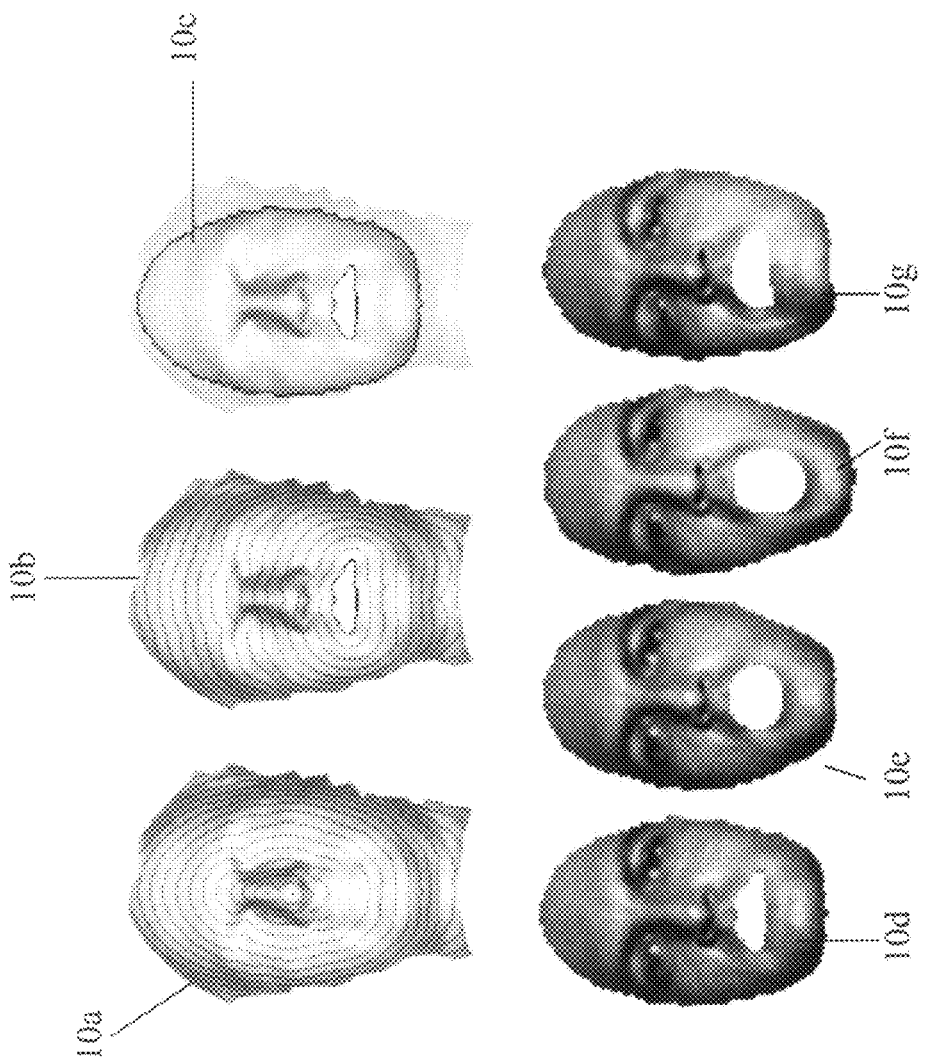
FIGS. 10A-10G are a series of the same face. The first three faces in the series illustrate the development of a boundary geodesic for face cropping, and the remaining four faces illustrate lip cropping for different mouth open states of the face.

FIG. 10 is a worked example, on a manifold, of the geodesic mask computation of FIGS. 3-7 and its insensitivity to facial expressions. As shown in face 10a, computation of the geodesic mask requires setting up of equidistant contours from first fixed sources, in this case equidistant contours are measured from two sources, one located at the tip of the nose and the second being the center of the bridge of the nose (left). In face 10b, equidistant contours are measured from sources located on the perimeter of the lips. In face 10c the final mask is obtained as a union of the two regions. In the second row: faces 10d to 10g show the final masks computed in the same way but with different initial expressions or degrees of open mouth. The examples show that the final mask is an effective capture of the outline of the face whatever the extent of the mouth being open. That is to say the geodesic mask is shown to have good insensitivity to facial expressions.

4 Topologically-Constrained Canonical Forms

Isometric transformations preserve intrinsic or geodesic distances among all points. Our model of the face thus assumes that the geodesic distance dij between any given two points $x_i$; $x_j$ on the facial surface remains unchanged. The first problem is that a discrete set of points $\{x_i\}_{i=1}^{N}$ j=1 can be ordered arbitrarily, and thus the matrix $D=(d_{ij})$ is invariant up to some permutation of the rows and columns. Moreover, when sampling a surface, there is no guarantee that the surface will be sampled at similar points, nor even that the number of points in two surfaces is necessarily the same. This makes the computation of such an invariant impractical.

An alternative is to avoid dealing explicitly with the matrix of geodesic distances, and replace the curved surface with its Riemannian metric by a different dual surface. Intrinsic geodesic distances are replaced by Euclidean ones in the embedding space. The new surface, approximates the original one in some optimal way. Such a procedure is called flat embedding, and the resulting set of points $x_i'$ in the Euclidean space is called the bending invariant canonical form of the face. Unlike the matrix D, the canonical form (though inevitably being an approximate representation of the original surface) is invariant, up to rotation, translation and reflection, which is much easier to deal with when trying to match two non-rigid surfaces.

We would like to find the "most isometric" embedding, the one that deforms the manifold distances the least. In practice, we have a finite discrete set of N manifold samples $\{x_i\}_{i=1}^{N}$ (represented as a 3×N matrix $X=(x_n;\ldots;x_N)$) and a set of $N^2$ mutual geodesic distances between these samples. We consider a mapping of the form $\phi: (M,d) \to (\mathbb{R}^m, d')$, which maps the manifold samples $x_i$ into points $x_i'$ in an m-dimensional Euclidean space, such that the geodesic distances $d_{ij}$ are replaced by Euclidean ones $d'_{ij} = \|x'_i - x'_j\|_2$.

The embedding error can be measured as a discrepancy between the geodesic and the resulting Euclidean distances using some norm, $$s(X';D) = \|D - D'(X')\|, \quad (1)$$

where $X' = (x'_1; \ldots; x'_N)$ is an m×N matrix representing the points in the embedding space, and D' is the matrix of mutual Euclidean distances depending on the points configuration X'. The function (1) is referred to hereinbelow as stress.

Finding the best approximate flat embedding is possible by minimization of s(X'; D) with respect to X'. A family of algorithms used to carry out such an approximate flat embedding is usually referred to as multidimensional scaling (MDS). These algorithms differ in the choice of the embedding error criterion and the numerical method used for its minimization.

One straightforward possibility is to choose the norm in (1) to be Euclidean, and thus have the metric distortion defined as a sum of squared differences $$s(X'; D) = \sum_{i>j} (d_{ij} - d'_{ij})^2, \quad (2)$$

and the MDS is posed as a least-squares (LS) problem and is known as LS-MDS. We used the iterative SMACOF algorithm to compute the canonical forms. The SMACOF algorithm is disclosed in I. Borg and P. Groenen. *Modern multidimensional scaling—theory and applications*, Springer-Verlag, Berlin Heidelberg New York, 1997; and also in J. De-Leeuw. *Recent developments in statistics*, chapter Applications of convex analysis to multidimensional scaling, pages 133-145. North-Holland, Amsterdam, 1977.

Figure 11:
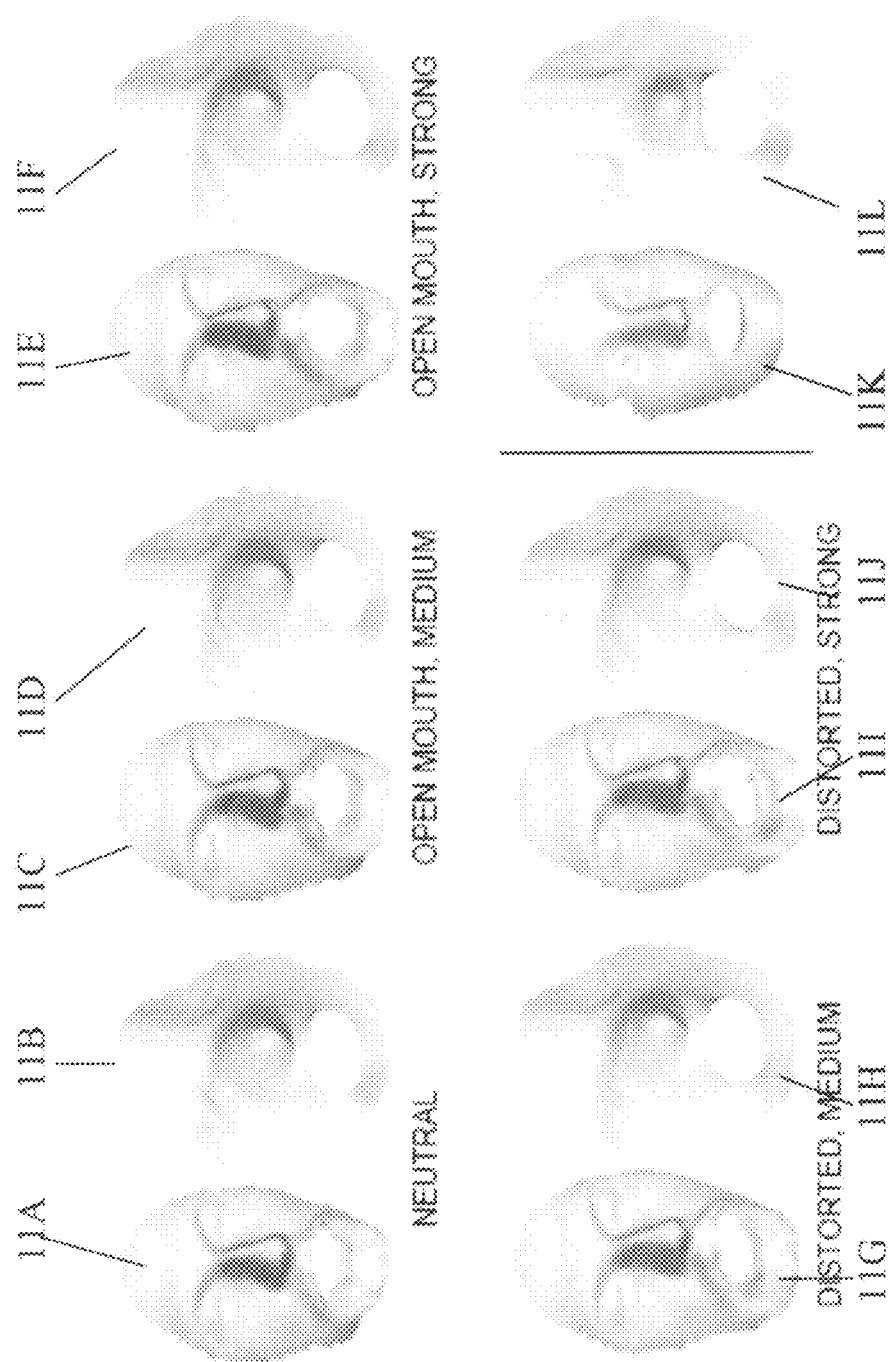
FIGS. 11A-11L illustrate different expression types with which the system of the present embodiments was tested.

When the embedding is performed into a space with m·3 dimensions, the canonical form can be plotted as a surface. FIG. 11 depicts canonical forms of one subject with different facial expressions. More particularly FIG. 11, faces 11A-11L shows examples of topologically-constrained canonical forms of faces with strong facial expressions, including expressions with closed, open, and partially open mouth. For comparison, faces 11K and 11L are a canonical form of a different subject.

It demonstrates that although the facial surface changes are substantial, the changes between the corresponding canonical forms are insignificant.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Figure 12:
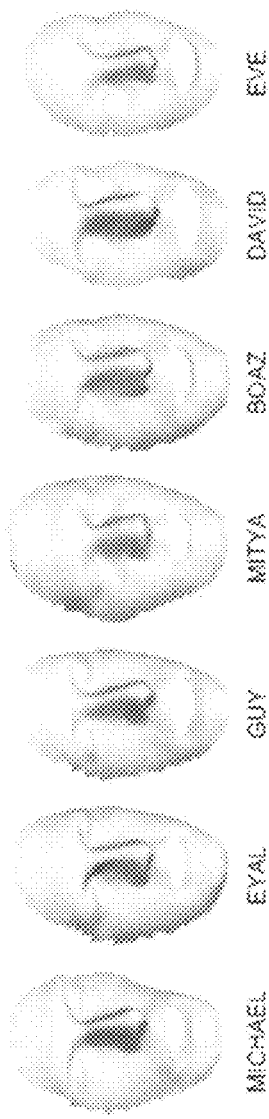
FIG. 12 illustrates different faces used to build up the database with which the present embodiments were tested.
Figure 13:
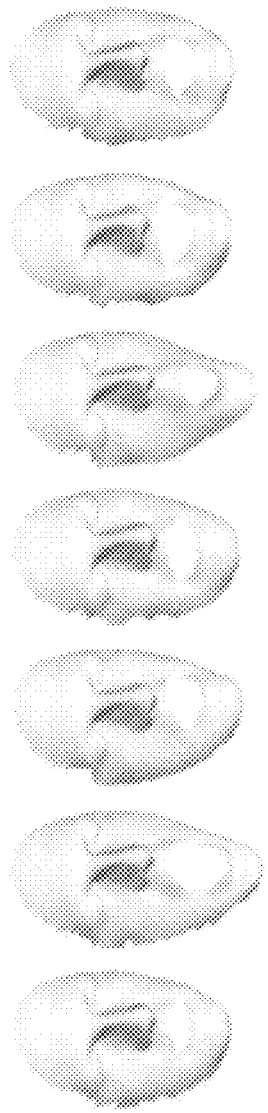
FIG. 13 illustrates the different expressions used with the faces of FIG. 12 in the database.
Figure 14:
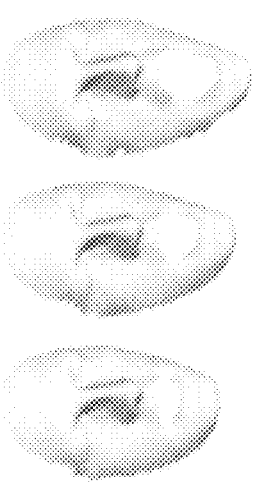
FIG. 14 illustrates three degrees of open mouth used with the expressions of FIG. 13.

The above-described approach was tested on a data set containing 102 instances of 6 subjects and one mannequin (Eve). The set of faces is shown in FIG. 12, in which all the faces have neutral expressions. As illustrated in FIG. 13 with just a single face, the human subjects appear in the data base with different facial expressions, classified into 7 groups (neutral expression+6 expressions with open or shut mouth). Furthermore as shown in FIG. 14 the expressions each appear in three strengths, weak, medium, and strong. A neutral expression is the natural posture of the face with a closed mouth; strong expressions are extreme postures that obviously rarely occur in real life. Head rotations of up to about 10 degrees were allowed.

Using the database, an experiment was carried out to test the sensitivity of the topologically constrained canonical forms to extreme facial expressions including open and closed mouth.

As a reference, the facial surfaces were also compared as rigid objects. Surface matching (both the facial surfaces and the canonical forms) was carried out by comparing their moments.

The surface is described as a vector of its 56 high-order moments, and the Euclidean norm is used to measure the distance between these vectors.

FIGS. 15A and 15B are graphical representations of the results of the experiment (15A) and the control (15B). More particularly FIGS. 15A and 15B depict a low-dimensional representation (obtained by MDS) of the dissimilarities (distances) between faces. Each symbol on the plot represents a face; colors denote different subjects; the symbol's shape represents the facial expression and its size represents the expression strength. Ideally, clusters corresponding to each subject should be as close as possible (meaning that the representation is insensitive to facial expressions) and as distant as possible from other subjects, which means that the representation allows us to discriminate between different subjects, and not between different expression. That is, the within class distances should be as small as possible, while the between classes distances should be as large as possible. It can be seen that using straightforward rigid surface matching as in the control in FIG. 15B, the clusters overlap, implying that variability due to facial expressions is larger than due to the subject's identity. On the other hand, using topologically-constrained canonical forms as in FIG. 15A, we obtain tight and distinguishable clusters.

Table 1 below is a description of the facial expressions in the data set used in the experiment of FIG. 15 and the inter-cluster to intra-cluster dissimilarity ratio using original and canonical surface matching. The triple asterisk in the table denotes an artificial subject.

| Subject | Color | Neut | Weak | Med | Str | Shut | Open | $\varsigma_k^{can}$ | $\varsigma_k^{orig}$ |
|---|---|---|---|---|---|---|---|---|---|
| Michael | Red | 2 | 2 | 10 | 6 | 6 | 14 | 2.55 | 17.10 |
| Eyal | green | 1 | 2 | 8 | 5 | 2 | 14 | 1.35 | 8.61 |
| Guy | magenta | 3 | 4 | 6 | 4 | 5 | 12 | 1.44 | 10.64 |
| Mitya | Yellow | 2 | 9 | 7 | 5 | 6 | 17 | 2.40 | 14.77 |
| Boaz d. | Cyan | 3 | 3 | 3 | 1 | 6 | 4 | 1.30 | 3.01 |
| David d. | Magenta | 1 | 2 | 4 | 3 | 1 | 9 | 0.97 | 8.65 |
| Eve*** | Black | 6 | — | — | — | 6 | — | 0.11 | 0.70 |

Table 1, final two columns, shows for the canonical forms case and the control respectively, the values of the ratio of the maximum inter-cluster to minimum intracluster dissimilarity.

$$\varsigma_k = \frac{\max_{i,j \in C_k} \eta_{ij}}{\min_{i \notin C_k, j \in C_k} \eta_{ij}}, \quad (3)$$

in which $C_k$ denotes indexes of the k-th subject's faces, $C = \cup_k C_k$ and $\eta_{ij}$ denotes dissimilarities between faces i and j) for facial and canonical surface matching. This criterion is convenient being scale-invariant; it measures the tightness of each cluster of faces that belong to the same subject and its distance from other clusters. Ideally, $\varsigma_k$ should tend to zero. The approach of the present embodiments, $9^{th}$ column, outperforms rigid facial surface matching, the $10^{th}$ column, by up to 790:3% in the sense of $\varsigma_k$.

Conclusions

In our previous patent application referred to hereinabove we used canonical forms to solve the problem of 3D face recognition.

In the present application we carry out a generalization of that approach to handle facial expressions with an open mouth. The method of topologically-constrained canonical forms is applicable to facial expressions with both closed and open mouth, and can thus handle extreme facial expressions. The resulting representation is especially suitable for 3D face recognition in a natural environment, for example, when a subject is speaking.

It is expected that during the life of this patent many relevant 3D data gathering and topology measurement devices and systems as well as devices, systems and methods for measuring contours and carrying out comparisons based on representations of three-dimensional data will be developed and the scope of the corresponding terms herein are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computerized method of cropping a three dimensional representation of a face for electronic processing wherein said method is available on and implemented on an appropriate computer readable medium or firmware and executed on a computer using an operating system, said method comprising:
    a. selecting a first geodesic contour about an invariant reference point on said three dimensional representation of said face,
    b. setting a region within said first geodesic contour as a first mask,
    c. selecting a second geodesic contour about a boundary of said identified first region,
    d. setting a region within said second geodesic contour as a second mask, and
    e. forming a final mask from a union of said first mask and said second mask, said final mask thus providing a cropped portion of said representation of said face as a union of regions defined by at least two geodesic contours; and
    f. exporting said representation of said face on to an appropriate computer readable medium or firmware executable by a computer using an operating system.

2. The method of claim 1, wherein said identifying comprises texture processing.

3. The method of claim 1, further comprising cropping said face by: forming a final mask from a union of said first mask and said second mask; and wherein said final mask is exported onto an appropriate computer readable medium or firmware executable by a computer using an operating system.

4. The method of claim 1 further comprising obtaining three-dimensional topographical data of said face with a three dimensional scanner, connected to a computer.

5. Apparatus comprising a three dimensional scanner operable with a computer for cropping a representation of a face for electronic processing said face having differential mouth opening states including an open mouth state, a closed mouth state and at least one intermediate state therebetween, the apparatus comprising:
    a. a first geodesic contour masking unit operative to select a first geodesic contour about an invariant reference point on said face, and setting a region within said first geodesic contour as a first mask, provided with said computer and wherein said first geodesic contour and said first mask are stored on an appropriate computer readable medium or firmware on said computer; and b. a second, geodesic contour, masking unit operative to select a second geodesic contour about a boundary of said identified mouth region, and setting a region within said second geodesic contour as a second mask, provided with said computer and wherein said second geodesic contour and said second mask are stored on an appropriate computer readable medium or firmware on said computer; and c. a third masking unit operative to form a final mask from a union of said first mask and said second mask, thereby to provide cropping of said face such as to obtain a fill facial region and negligible background within said cropping for any of said mouth opening states, provided with said computer and wherein said final mask is stored on an appropriate computer readable medium or firmware on said computer.

6. The apparatus of claim 5 wherein a plurality of three dimensional representation of said face including a plurality of different mouth opening states including an open mouth state, a closed mouth state and at least one intermediate state therebetween is obtained with said three dimensional scanner.

* * * * *